US012694009B2

(12) United States Patent
Bunescu et al.

(10) Patent No.: US 12,694,009 B2
(45) Date of Patent: **\*Jul. 28, 2026**

(54) TRACKING EVALUATION OF WORKLOAD STABILITY THROUGH PERFORMANCE INDEXING

(71) Applicant: Snowflake Inc., Bozeman, MT (US)

(72) Inventors: Vlad Bunescu, Morgan Hill, CA (US); Joshua Klahr, San Carlos, CA (US); Louis Magarshack, San Francisco, CA (US); Shiyu Qu, Bellevue, WA (US); Zerui Wei, San Mateo, CA (US); Jiaqi Yan, Menlo Park, CA (US)

(73) Assignee: Snowflake Inc., Bozeman, MT (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/678,357

(22) Filed: May 30, 2024

(65) Prior Publication Data

US 2024/0320202 A1      Sep. 26, 2024

Related U.S. Application Data

(63) Continuation of application No. 18/112,198, filed on Feb. 21, 2023, now Pat. No. 12,026,140.

(51) Int. Cl.
G06F 17/00          (2019.01)
G06F 16/22          (2019.01)
G06F 16/25          (2019.01)

(52) U.S. Cl.
CPC ........ G06F 16/2228 (2019.01); G06F 16/254 (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | |
|---|---|---|---|
| 7,191,174 B2 | 3/2007 | Day et al. | |
| 8,285,709 B2 | 10/2012 | Candea et al. | |
| 8,418,089 B2 * | 4/2013 | Higuchi | ..... G06F 30/3323 |
| | | | 716/108 |

(Continued)

OTHER PUBLICATIONS

"U.S. Appl. No. 18/112,198, Non Final Office Action mailed Jan. 2, 2024", 9 pgs.

(Continued)

*Primary Examiner* — Hung D Le

(74) *Attorney, Agent, or Firm* — Schwegman Lundberg & Woessner, P.A.

(57) ABSTRACT

Methods, systems, and computer programs are described for tracking evaluation of workload stability through performance indexing. A plurality of metric source data is received by at least one hardware processor. Based on this data, a workload is identified as a stable workload candidate. A performance index is then generated, reflecting the characteristics of the identified stable workload candidate. The performance index is continuously tracked over a period of time, enabling the detection and analysis of any modifications to the workload and the subsequent impact on system performance.

30 Claims, 10 Drawing Sheets

(56) References Cited

U.S. PATENT DOCUMENTS

| | | | | |
|---|---|---|---|---|
| 9,027,000 | B2 * | 5/2015 | Guerrera | G06F 11/3419 |
| | | | | 717/130 |
| 9,208,053 | B2 * | 12/2015 | Kejariwal | G06F 11/3442 |
| 10,135,703 | B1 * | 11/2018 | Gupta | G06F 11/3452 |
| 10,496,643 | B2 * | 12/2019 | Kandula | G06F 16/2462 |
| 10,554,771 | B2 * | 2/2020 | Park | H04L 67/535 |
| 10,922,313 | B2 * | 2/2021 | Collins | G06F 16/24542 |
| 11,429,627 | B2 * | 8/2022 | Burnett | G06F 16/243 |
| 11,928,513 | B1 * | 3/2024 | Jiang | G06N 20/20 |
| 2002/0059229 | A1 | 5/2002 | Natsumeda et al. | |
| 2003/0046203 | A1 | 3/2003 | Ichihari et al. | |
| 2005/0187950 | A1 | 8/2005 | Parker et al. | |
| 2007/0100720 | A1 | 5/2007 | Bonvouloir | |
| 2008/0071906 | A1 | 3/2008 | Thoennes et al. | |
| 2009/0037238 | A1 | 2/2009 | Macgregor | |
| 2009/0327030 | A1 | 12/2009 | Collins | |
| 2011/0055201 | A1 | 3/2011 | Burger | |
| 2012/0066148 | A1 | 3/2012 | Sagi et al. | |
| 2012/0197426 | A1 | 8/2012 | Murphy et al. | |
| 2012/0265670 | A1 | 10/2012 | Abiola et al. | |
| 2013/0036122 | A1 * | 2/2013 | Cohen | G06F 11/3409 |
| | | | | 707/E17.083 |
| 2015/0032758 | A1 * | 1/2015 | Schneider | G06F 16/2272 |
| | | | | 707/741 |
| 2015/0066900 | A1 * | 3/2015 | Schneider | G06F 16/24542 |
| | | | | 707/718 |
| 2015/0134265 | A1 * | 5/2015 | Kohlbrecher | G16H 40/63 |
| | | | | 702/19 |
| 2015/0277831 | A1 * | 10/2015 | Kuranoshita | G06F 3/1275 |
| | | | | 358/1.15 |
| 2015/0278731 | A1 * | 10/2015 | Schwaber | G06Q 10/0639 |
| | | | | 717/102 |
| 2016/0098020 | A1 * | 4/2016 | Salsbury | G05B 11/42 |
| | | | | 700/32 |
| 2016/0127921 | A1 * | 5/2016 | Bhatia | H04M 15/58 |
| | | | | 455/422.1 |
| 2016/0342447 | A1 * | 11/2016 | Richter | G06F 9/5083 |
| 2017/0091276 | A1 * | 3/2017 | Hawton | G06F 16/217 |
| 2017/0181013 | A1 * | 6/2017 | Toka | H04W 24/04 |
| 2017/0300538 | A1 * | 10/2017 | Seuss | G06F 16/2272 |
| 2019/0066243 | A1 * | 2/2019 | Watkins, Jr. | G06F 16/901 |
| 2019/0253015 | A1 | 8/2019 | He et al. | |
| 2019/0339132 | A1 * | 11/2019 | Hofleitner | A47J 36/00 |
| 2020/0104401 | A1 * | 4/2020 | Burnett | G06F 16/287 |
| 2020/0356579 | A1 * | 11/2020 | Anderson | G06F 16/3338 |
| 2022/0197235 | A1 * | 6/2022 | Warake | G05B 19/042 |
| 2023/0068216 | A1 * | 3/2023 | Gottin | G06F 11/3485 |
| 2023/0177052 | A1 * | 6/2023 | Li | G06F 16/24524 |
| | | | | 707/713 |
| 2023/0195710 | A1 * | 6/2023 | Wang | G06F 16/2365 |
| | | | | 707/741 |
| 2023/0385261 | A1 * | 11/2023 | Siddiqui | G06F 16/2272 |
| 2024/0232042 | A1 * | 7/2024 | McCarthy | G06F 11/3485 |

OTHER PUBLICATIONS

"U.S. Appl. No. 18/112,198, Notice of Allowance mailed Mar. 27, 2024", 19 pgs.

"U.S. Appl. No. 18/112,198, Response filed Jan. 31, 2024 to Non Final Office Action mailed Jan. 2, 2024", 12 pgs.

* cited by examiner

400

109

PERFORMANCE INDEX SERVICE

440
WORKLOAD MANAGER

415
PRODUCTION
WORKLOAD
SERVICE

425
PRODUCTION
METRICS
SERVICE

435
HISTORICAL
INDEX
MANAGER

445
STABILITY MANAGER

450
STABLE
WAREHOUSE
ANALYZER

460
STABLE
RECURRENT
QUERY
ANALYZER

470
STABLE
SOURCE
ANALYZER

480
PERFORMANCE INDEX MANAGER

485
GLOBAL
INDEX
SERVICE

486
SUB-INDEXES
(DRILL-DOWN)
SERVICE

487
INDEX
DEFINITION
SERVICE

488
COMPOSITIONS
AND
CONTRIBUTIONS
SERVICE

STABLE WAREHOUSE ANALYZER

832

| METRIC MEASUREMENTS | THRESHOLDS |
|---|---|
| CREDIT VMR | VMR IS LOW ENOUGH |
| NUMBER OF JOBS VMR | VMR IS LOW ENOUGH |
| WAREHOUSE SIZE | DOES NOT CHANGE |
| SCALING POLICY | DOES NOT CHANGE |
| AMOUNT OF DATA READ VMR | VMR IS LOW ENOUGH |
| AMOUNT OF DATA WRITTEN VMR | VMR IS LOW ENOUGH |
| PEAK/MEDIAN/ AVERAGE CONCURRENCY | WITHIN A SPECIFIED NUMBER OF PERCENTAGE POINTS EVERY DAY |

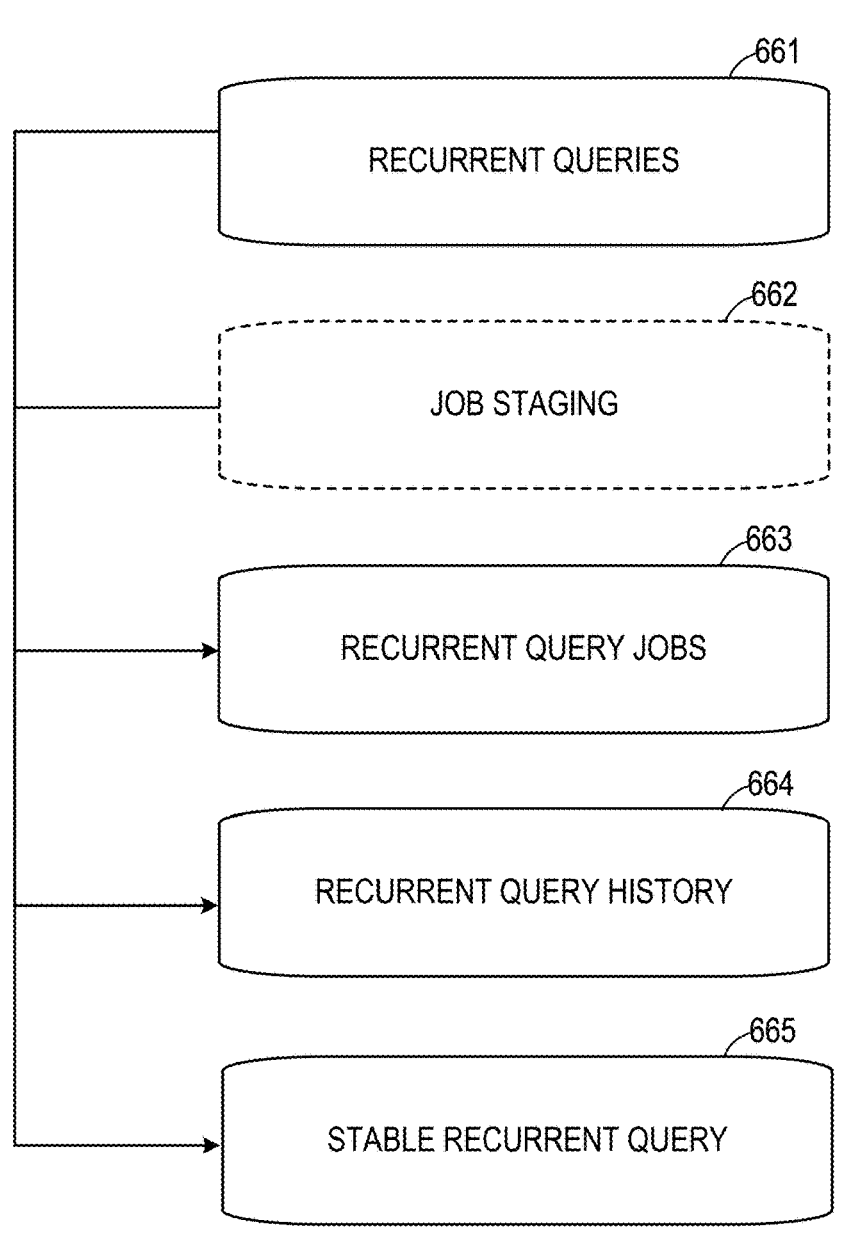
FIG. 6

| METRICS | AVG. BEFORE | AVG. AFTER | % CHANGE | SIGNIFICANCE |
|---|---|---|---|---|
| BYTES WRITTEN/ PRODUCED ROW | 229.1995265 | 222.186587867 | 3.156328517 | NOT SIGNIFICANT |
| COMPUTE CREDITS/EP JOB | 0.017908989293 | 0.019530081523 | -2.257572461 | NOT SIGNIFICANT |
| AVG. EXECUTION TIME | 65.819408071 | 69.487965667 | -5.279414299 | NOT SIGNIFICANT |
| AVG. SCHEDULING TIME | 23.733413571 | 36.0841328 | -34.227562838 | SIGNIFICANT |

DASHBOARDS   PARAMETER   METRICS   RESULTS   CHART   QUERIES

METRICS DASHBOARD

READER ACCOUNTS

× NEW TAB   × | +

700

703

704   702   721   704   722   708   723   709   724   760

706   706A   706B   706C   706D

800
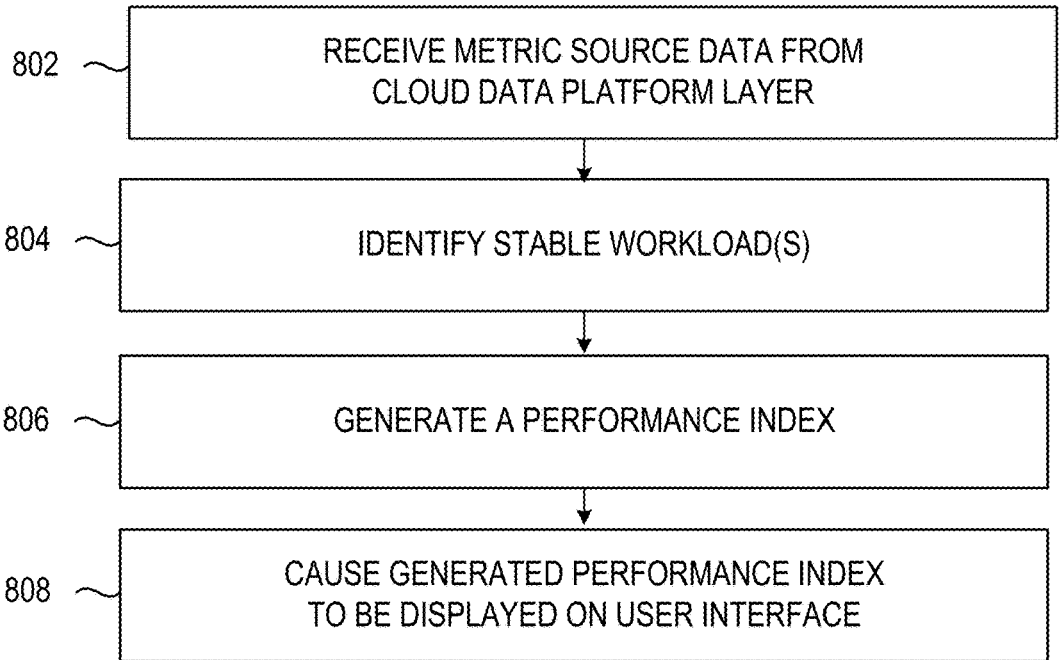
802 — RECEIVE METRIC SOURCE DATA FROM CLOUD DATA PLATFORM LAYER
804 — IDENTIFY STABLE WORKLOAD(S)
806 — GENERATE A PERFORMANCE INDEX
808 — CAUSE GENERATED PERFORMANCE INDEX TO BE DISPLAYED ON USER INTERFACE
FIG. 8

900

TRACKING EVALUATION OF WORKLOAD STABILITY THROUGH PERFORMANCE INDEXING

PRIORITY CLAIM

This application is a Continuation of U.S. patent application Ser. No. 18/112,198, filed Feb. 21, 2023, the contents of which are hereby incorporated by reference.

TECHNICAL FIELD

The present disclosure generally relates to special-purpose machines that manage data platforms and databases and, more specifically, data platforms for identifying system performance over time and generating a performance index that is sensitive to production workload changes.

BACKGROUND

Network-based database systems may be provided through a cloud data platform, which allows organizations, customers, and users to store, manage, and retrieve data from the cloud. With respect to type of data processing, a cloud data platform could implement online transactional processing, online analytical processing, a combination of the two, and/or other types of data processing. Moreover, a cloud data platform could be or include a relational database management system and/or one or more other types of database management systems.

One such example is a cloud data warehouse (also referred to as a "network-based data warehouse," "virtual data warehouse," or simply as a "data warehouse"), which is a cloud data platform used for data analysis and reporting that comprises a central repository of integrated data from one or more disparate sources. A data warehouse can store current and historical data that can be used for creating analytical reports for an enterprise. To this end, data warehouses can provide business intelligence tools, tools to extract, transform, and load data into the repository, and tools to manage and retrieve metadata.

BRIEF DESCRIPTION OF THE DRAWINGS

Various ones of the appended drawings merely illustrate example embodiments of the present disclosure and should not be considered as limiting its scope.

FIG. 4 is a block diagram illustrating components of a performance index service, according to some example embodiments.

FIG. 5 shows an output table associated with stable warehouses, according to some example embodiments.

FIG. 6 is a block diagram depicting determination of recurrent queries, according to example embodiments.

FIG. 8 is a flow diagram illustrating operations of a method for calculating a performance index value, according to some example embodiments.

DETAILED DESCRIPTION

Figure 1:
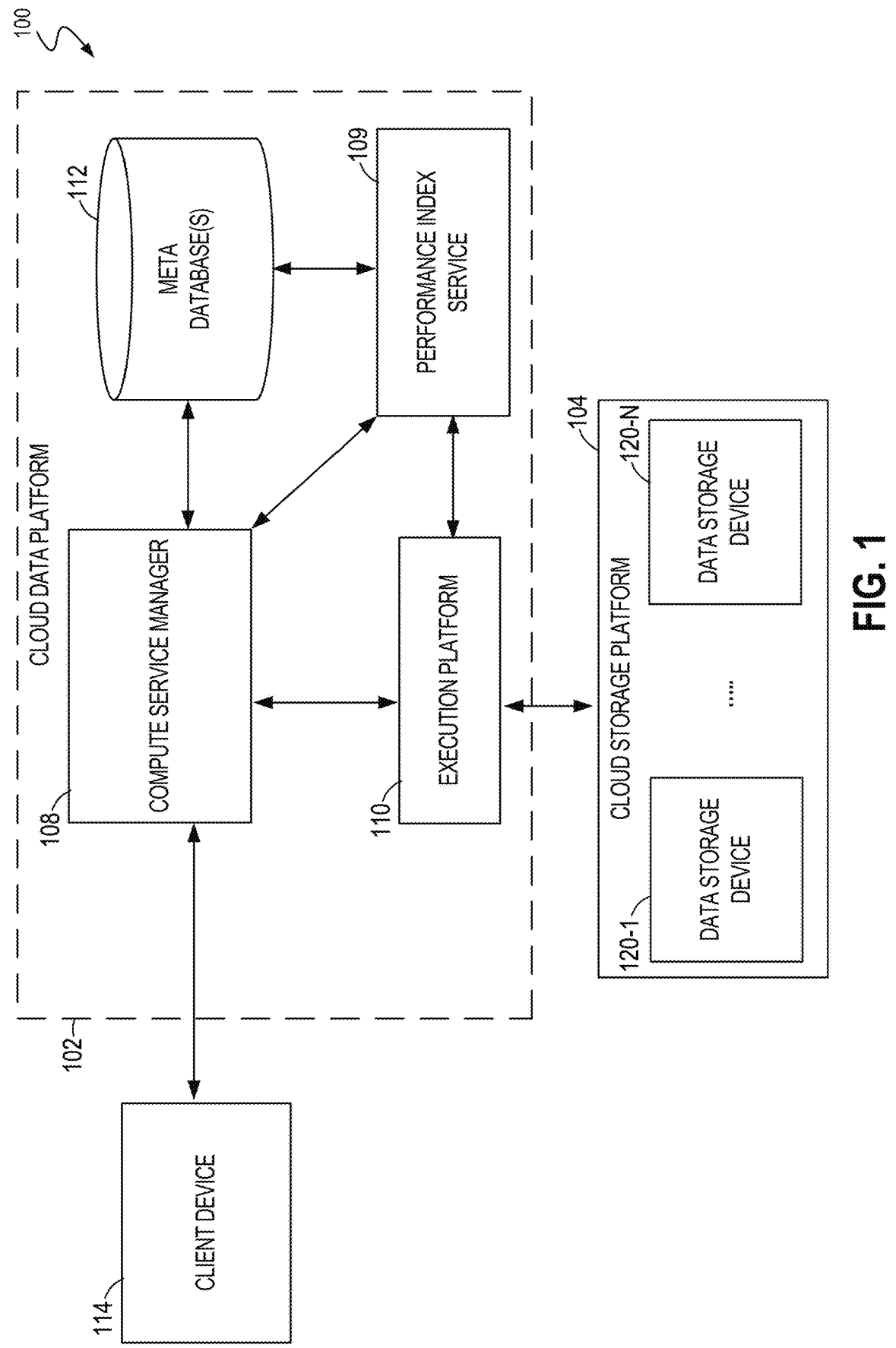
FIG. 1 illustrates an example computing environment in which a cloud data platform is in communication with a cloud storage provider system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques are not necessarily shown in detail.

Example embodiments of the present disclosure include the generation of a performance index by leveraging the functionality of a cloud data platform to provide near real-time analysis of metrics for customers and users of the platform based on real production workloads. The cloud data platform provides for application developers, data scientists, and data engineers to develop data pipelines and products by employing data engineering, data science, and data warehousing. The cloud data platform performance index creates an index to capture any or all aspects of system performance over a period time while being sensitive to product improvements, changes, updates, and the like. More specifically, example embodiments provide a stable and reliable solution to track, measure, compare, and analyze database performance changes of real production workloads over extended periods of time along arbitrary dimensions and performance metrics using performance indexing. For the purposes of this description, the phrase "a cloud data platform performance index" may be referred to as and used interchangeably with the phrases "an index system," "a performance index," "a performance index service," "performance-as-a-product service," "global index," "sub-index," or merely "an index."

Traditional approaches for tracking performance include using a fixed set of synthetic (e.g., artificially generated) benchmarks with predefined performance metrics that can be consistently tracked, where these benchmarks are designed to stress specific aspects of a system and are not always representative of real-world performance. Alternative conventional systems attempt to leverage natural experiments to recognize invariant aspects of production workloads (e.g., features that remain constant and unchanged) that can be used for comparison over time regardless of specific inputs, conditions, and/or actual workloads. However, both traditional approaches fail to be representative of a customer's production workloads that are affected by variations in input data, factor changes, and/or other workload updates. Thus, conventional systems fail to capture customer's performance experiences on a cloud data platform using real-time or near real-time data.

For example, pre-existing solutions for measuring database performance using synthetic benchmarks (e.g., TPC-DS) include using a fixed set of queries that database engineers use to test the database performance and benchmark the performance against previous results from testing the same benchmark. For example, conventional database agents are over-optimized to score "best" in certain benchmarks (e.g., TPC-DS), such as scoring as close as possible to a "perfect score" for purposes of showing customers how good the benchmark-database agent is. Such conventional database agents score well in theory, but they fail to identify performance impacts for real-world customers executing real-world workloads because conventional agents are primarily artificial benchmarks that are optimized against issues, failure, and poor-performance possibilities. In addition, conventional methods include using naive aggregations of production metrics that are unstable and unreliable, causing difficulty in implementing direct comparisons over longer time periods due to continuous workload changes. Thus, synthetic benchmarks are not sufficient to capture and analyze performance of a cloud data platform's real-world production queries and workloads.

Performance metrics for cloud data platforms typically include measures of throughput, scalability, reliability, cost, and the like. However, with current infrastructure and metrics available today, it is difficult to evaluate many aspects of cloud data platform performance as it corresponds to real-world production (e.g., actual customer workloads). Performance numbers collected and aggregated across the cloud data platform deployments tend to be very unstable and are not useful for measuring global performance trends. Conventional systems are insensitive to variations in customer workloads, as there are no existing methods and system for tracking performance trends over an extended period of time (e.g., over quarters to multiple years) since workloads tend to change over time, causing performance numbers to be incomparable over a longer period of time. In addition, existing performance analysis systems fail to distinguish between customer workload changes and performance changes caused by a cloud data platform such as new features and optimizations.

Existing performance methods fail to overcome such technical challenges for multiple reasons. For example, current performance models do not have visibility of performance characteristics and problems across a number of dimensions, do not have a standardized methodology of evaluating the impact of each performance improvement on the overall cloud data platform workload, and do not have standardized measurements over a number of critically derived metrics in production beyond raw performance measurements. Currently, for many performance improvements, the random variations or errors in data (e.g., noise) is so large it often obscures underlying patterns, relationships, and/or measurable performance improvements leading to inaccurate or unreliable results. Thus, it is impossible to accurately measure the impact of a specific change to production workloads. Furthermore, conventional systems fail to compare performance of a database over extended periods of time by simply comparing two endpoints (e.g., a beginning state and an end state) when workloads typically have changed significantly with a small degree of overlap.

Example embodiments of the present disclosure improve upon existing models and overcome such current technical challenges by providing a stable and reliable system to measure and compare database performance changes based on real production workloads over extended periods of time, including analysis along arbitrary dimensions and performance metrics. The methods and systems described herein leverage natural experiments (e.g., what customers run stably in their production environments) and identify stable workloads to compare workloads that are run in different settings (e.g., different parameters, different time periods, different versions of the cloud data platform, etc.) without the use of synthetic benchmarks.

Thus, example embodiments of the present disclosure solve the technical problem relating to performance tracking by allowing for accurate assessments of the impact of each specific change to production workloads by building a performance index and/or collection of indexes that are stable, reliable, extensible, and composable, enabling near real-time tracking of cloud data platform performance improvements and regression over time.

Example embodiments include technical solutions over prior performance tracking attempts by implementing a system for measuring stable performance indexing that minimizes errors and provides for an improved representation of customer experience by building measurement methodologies and systems through leveraging real production workloads and queries instead of using fixed, narrow synthetic benchmarks. These example embodiments enable the tracking of performance changes over extended periods of time to provide for customer and user understanding of historical performance trends, including enabling drill-down dimensionality to sub-indexes of a global index to arbitrary dimensions and categories (e.g., measurements of arbitrary performance metrics and price performance of the system).

Example embodiments further enable continuous evolution of performance index definitions and compositions, providing for measuring relative performance changes as opposed to using concrete metric numbers. Example embodiments include identifying stable workloads by defining stable warehouses, stable recurrent queries, and/or additional stable data sources to help stabilize measurements or performance, including defining contributions to help with drill-down dimension analysis. Thus, example embodiments provide for improved understanding of the impact of a specific change on a target workload, as well as understanding of the performance of the overall cloud data platform.

FIG. 1 illustrates an example computing environment 100 that includes a database system in the example form of a cloud data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the cloud data platform 102 in communication with a cloud storage platform 104 (e.g., AWS®, Microsoft Azure Blob Storage®, or Google Cloud Storage). The cloud data platform 102 is a network-based system used for reporting and analysis of integrated data from one or more disparate sources including one or more storage locations within the cloud storage platform 104. The cloud data platform 102 can be a network-based data platform or network-based data system. The cloud storage platform 104 comprises a plurality of computing machines and provides on-demand computer system resources such as data storage and computing power to the cloud data platform 102.

The cloud data platform 102 comprises a compute service manager 108, an execution platform 110, and one or more metadata databases 112. The cloud data platform 102 hosts and provides data reporting and analysis services to multiple client accounts.

The compute service manager 108 coordinates and manages operations of the cloud data platform 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the cloud data platform 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the cloud data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N can be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

The compute service manager 108, metadata database(s) 112, and execution platform 110 are operatively connected to a performance index service 109, which provides for the monitoring and determination of stable workloads on the cloud data platform 102 and generation of a collection of performance indexes related to the workloads. The performance index service 109 can receive metric data related to customer or user workloads from any of the compute service manager 108, metadata database(s) 112, execution platform 110, or alternative operatively connected modules from within the cloud data platform 102, or externally connected data sources. The performance index service 109 is depicted and described in combination with FIG. 4.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, performance index service 109, and cloud storage platform 104 are shown in FIG. 1 as individual discrete components. However, each of the compute service manager 108, metadata database(s) 112, execution platform 110, performance index service 109, and cloud storage platform 104 can be implemented as a distributed system (e.g., distributed across multiple systems/platforms at multiple geographic locations). Additionally, each of the compute service manager 108, metadata database(s) 112, execution platform 110, performance index service 109, and cloud storage platform 104 can be scaled up or down (independently of one another) depending on changes to the requests received and the changing needs of the cloud data platform 102. Thus, in the described embodiments, the cloud data platform 102 is dynamic and supports regular changes to meet the current data processing needs.

During typical operation, the cloud data platform 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a suitable candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
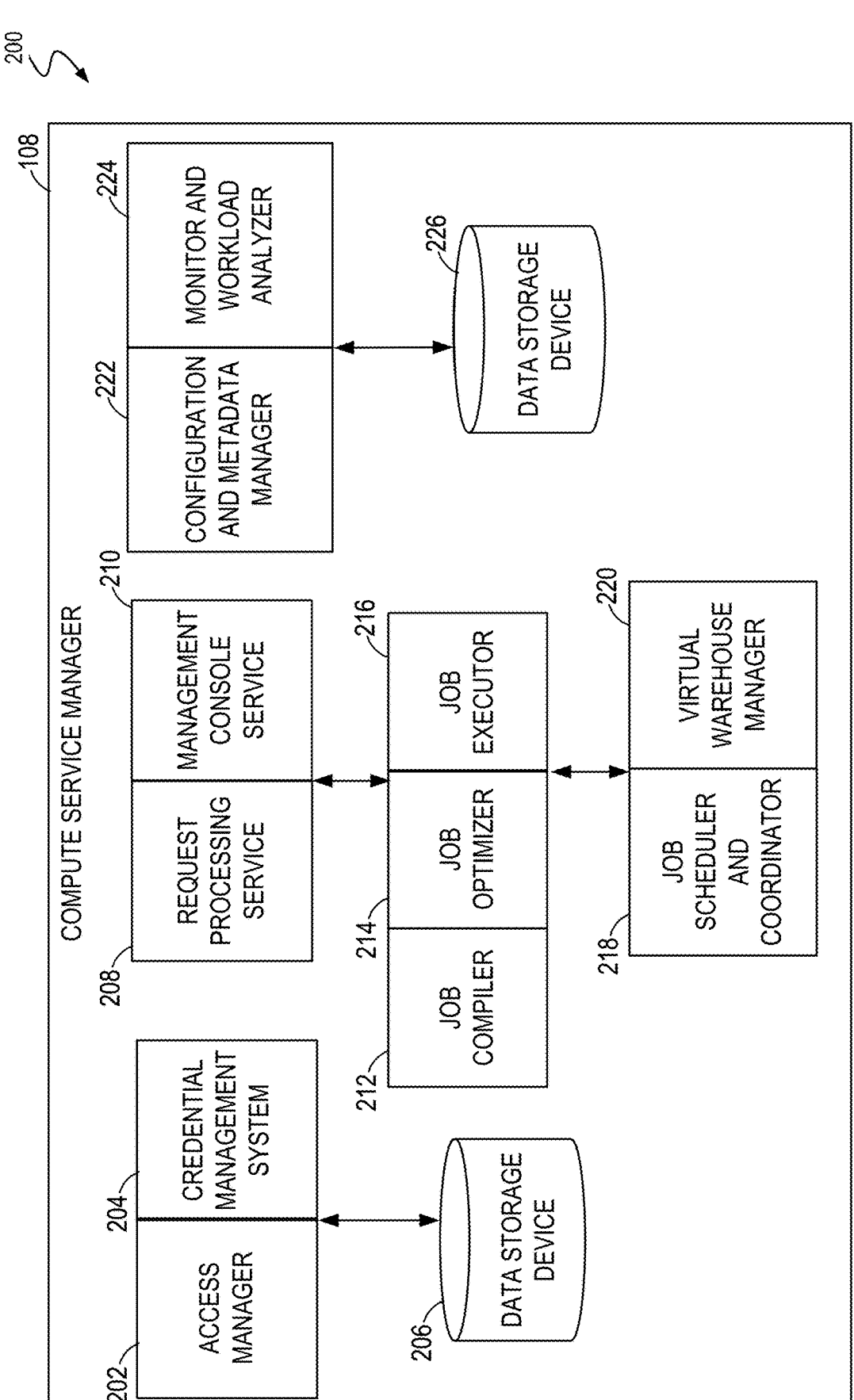
FIG. 2 is a block diagram illustrating components of a compute service manager, according to some example embodiments.

FIG. 2 is a block diagram 200 illustrating components of the compute service manager 108, in accordance with some embodiments of the present disclosure. As shown in FIG. 2, the compute service manager 108 includes an access manager 202 and a credential management system 204 coupled to data storage device 206, which is an example of the metadata database(s) 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data can be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs can be prioritized and then processed in that prioritized order. In an embodiment, the job scheduler and coordinator 218 determines a priority for internal jobs that are scheduled by the compute service manager 108 with other "outside" jobs such as user queries that can be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the cloud data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the cloud data platform 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
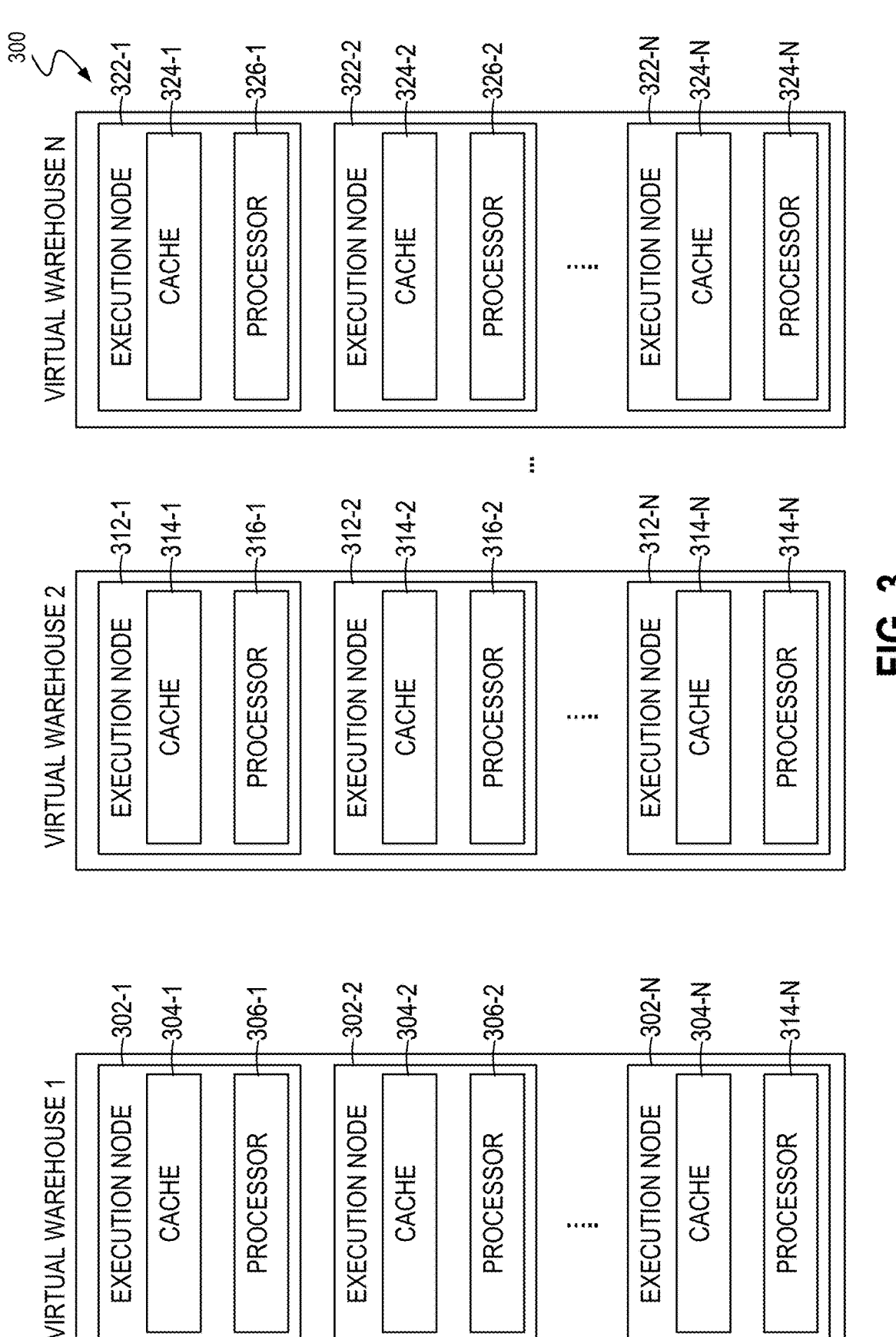
FIG. 3 is a block diagram illustrating components of an execution platform, according to some example embodiments.

FIG. 3 is a block diagram 300 illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 110, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

FIG. 4 is a block diagram 400 illustrating components of the performance index service 109, in accordance with example embodiments. As is shown in FIG. 4, the performance index service 109 includes a workload manager 440, a stability manager 445, and a performance index manager 480. As is shown in FIG. 4, the performance index service 109 manages a repeatable measure of user and customer workload performance by providing a diagnostics and analytics tool for understanding the relationship between performance features and metrics. The performance index service 109 provides mechanisms to capture and report on customer-delivered data platform performance improvements using the cloud data platform 102.

The workload manager 440 manages changes to the user workload on the cloud data platform 102, as well as changes to the cloud data platform 102, such as updates, performance features, service changes, and the like. The workload manager 440, or components thereof, distinguish, manage, and control performance issues caused by user workloads and performance issues caused by new features and/or optimization to the cloud data platform or systems therein. The workload manager 440, which incorporates a production workload service 415, a production metrics service 425, and a historical index manager 435.

The production workload service 415 manages production workloads in the cloud data platform 102 for use by customers and users. As used herein, the term "workload" can indicate one or more tasks, queries, requests, logical units of work, and the like that can be executed in the cloud data platform 102, although additional cloud-based workloads can be incorporated. The production workload service 415 further provides integration with additional services, such as data visualization, workload management, and business intelligence platforms.

The production metrics service 425 manages metrics that are used to monitor, measure, and examine the performance of systems, workloads, queries, applications, and the like running in a production environment of the cloud data platform. For example, production metrics can include resource utilization, response time, availability, throughput, scaling, and others. Metrics can also include workload metrics, query metrics, warehouse metrics, pipeline metrics, etc. For example, query execution time, query concurrency, query throughput, data scanned, data returned, and the like. These metrics can provide insights into the health, efficiency, and/or status of the cloud data platform as well as insights into the health, efficiency, and/or status of workloads in production on the cloud data platform. The production metrics service 425 can manage metrics to help identify and diagnose issues that can be impacting the performance of production workloads, production queries, and the like.

Metrics for cloud data platforms typically include measures of throughput, scalability, reliability, cost, and the like. For example, throughput can be a measure of how much data a platform can process in a given time, such as queries per second, data process per second, etc. Scalability can be a measure of how well a platform can manage increasing workloads, such as by adding more nodes or processing units. Reliability can be a measure of how consistently a platform can deliver its services, such as by maintaining a high uptime and providing fast response times for queries. Cost can be a measure of how much it costs to use the platform, which can include factors such as storage and compute costs, as well as fees or charges for using the platform's services. Metrics are described and depicted in more detail herein in connection to FIG. 7.

Returning to FIG. 4, the performance index service 109 further includes the historical index manager 435 that manages one or more indexes and/or sub-indexes that are a representation of performance trends measured relative to one or more other indexes from previous time periods and used for performance comparisons. For example, a first performance index (e.g., V0) is built based on cloud data platform 102 measurements (e.g., varied factors associated with the cloud data platform and/or workload). After a period of time (e.g., hours, weeks, quarters, years, etc.), the performance index service 109 generates a second performance index (e.g., V1) based on measurements from the cloud data platform 102 at a different time, using different cloud data platform measurements, and/or using different parameters, metrics, settings, and the like. The historical index manager 435 maintains the generated historical performance indexes and sub-indexes, which can be used for comparison based on the previous index values.

The performance index service 109 further includes the stability manager 445 to determine stable data sources from which to calculate the performance index. More specifically, the stability manager 445 identifies candidate workloads and candidate queries to determine stable workloads to compare across time periods. In some example embodiments, a workload is regarded as being stable across two periods when a number of identifiable characteristics of the workload remain consistent. In additional embodiments, a workload is defined as being stable across one or more periods of time based on other characteristics, classifications, and/or trends.

In the example embodiment of FIG. 4, the stability manager 445 manages access and determination of stable workloads, and includes a stable warehouse analyzer 450, a stable recurrent query analyzer 460, and an additional stable source analyzer 470. The stable workloads are used by the performance index service 109, and components thereof, to identify candidate workloads and queries to compare across periods of time. The stability manager 445 can identify a workload as stable across two time periods when a number of identifiable characteristics of the workload remain consistent. The stability manager 445 identifies stable workloads based on determinations of stable warehouses, stable recurrent queries, and other stable data sources.

The stability manager 445 employs the stable warehouse analyzer 450 and the stable recurrent query analyzer 460 to help identify and/or define stable workloads based on stable known, identified, and/or determined stable data sources. The stable data sources may be stable workloads, stable recurrent queries, or other stable sources (e.g., tables, pipelines, applications, etc.).

Stable workloads can be automatically detected based on production patterns (e.g., query patterns) and are further divided into subcategories, such as drill-down dimensions (e.g., workload types, customer accounts, query type, deployment, etc.), to provide more detailed performance understanding. The performance index service 109 further makes use of stable workloads to isolate and differentiate performance changes caused by the cloud data platform from workload changes associated with the customer workload.

In some example embodiments, stable workloads can be used to validate the impact of changes in the cloud data platform services. Stable workloads can be used in an incremental automated process to evaluate and predict the possibility of future changes to be deployed to a subset of customers of the cloud data platform, and how the future deployment to additional customers will receive the deployment based on a subset of queries or warehouse that will be impacted by the change. For example, if only 1% of queries will be impacted by a service change on the cloud data platform, a subset of the index (e.g., a sub-index) can be generated to focus solely on the 1% of queries that will be affected. The sub-index can be used to produce additional metrics, such as a confidence score (e.g., measure) or the like, and the cloud data platform can utilize that confidence score to project an impact of the change on other metrics (e.g., performance, cost, etc.). As such, this measurement becomes feedback data returned to the cloud data platform to analyze cloud data platform changes in near real-time or real-time.

The stable warehouse analyzer 450 determines and manages tables containing lists of warehouses that have been marked as stable during any given time period (e.g., a given day). Additional details related to determining stable warehouses are depicted and provided herein in connection with FIG. 5. The stable recurrent query analyzer 460 determines and manages a recurrent query infrastructure for collecting queries that can be defined as stable. Additional details related to determining stable recurrent queries are depicted and provided herein in connection with FIG. 6.

The stability manager 445 further includes the stable source analyzer 470 to determine and manage additional data sources on the cloud data platform 102 that can be used to provide other stable data sources. For example, similarly to stable warehouses and stable recurrent queries, the cloud data platform 102, or components thereof such as the stable source analyzer, can further locate, define, and manage a stable data source by identifying patterns of consistency in a data source (e.g., a table or ETL pipeline), define these identified data sources as stable, and generate an index or sub-index to analyze these stable patterns.

To provide continual tracking, the performance index service 109 incrementally compares stable workloads using adjacent time periods when tracking performance trends over lengthy periods of time. The performance index service

109 uses narrow and adjacent comparison windows (e.g., daily granularity), such that there are a large number of overlapping stable workloads that can be used to measure the relative performance. For example, for any two adjacent time periods, the rate of workload changes is generally limited such that workloads are still sufficiently similar for providing a good overlap in features, metrics, parameters, etc. Such overlap enables the performance index service 109 to update the performance index in the new period of time using the overlapping stable workloads. When accumulated over time, the performance index service 109 constructs one or more indexes and/or sub-indexes that enable comparison over extended periods of time while covering a large subset of workloads.

The performance index service 109 further includes the performance index manager 480 that manages the performance index, and includes a global index service 485, a sub-indexes service 486, an index definition service 487, and a compositions and contributions service 488.

The global index service 485 manages global performance indexes, which can provide a singular index value denoting the performance measurements of the system. The global performance index can additionally be created from one or more sub-indexes. For example, the global index service 485 can calculate an execution time global index. The index for execution time uses previous computations of stable warehouses as input for the execution time computation. The execution time calculation is formulated as:

$$\frac{\text{Total } XP \text{ Time}}{\text{Number of } XP \text{ Jobs} \times \text{Baseline}}$$

Where baseline is a constant value based on a specific date, either automatically generated or manually selected by a user and XP is the execution platform.

When calculating or generating performance indexes, the underlying metrics, parameters, and/or definitions related to workloads can evolve in order to compute the index at varying time periods. For example, when a definition change occurs, the cloud data platform recomputes the previous value of the index employing the new or updated definition changes, and compares the values computed from both definitions to derive a new baseline (e.g., global index value). If the definition is updated or changed, the baseline constant value based on a specific date is also changed to be computed on the day of transition, without the need for backfilling data.

For example, if the performance index was updated, according to an example embodiment, updating the performance index can include changing the index to a new measure (e.g., instead of average). For example, on day t_0, a customer or user implements an update to the index definition. In response, the performance index service 109 must derive a new baseline, which includes first computing the index value for the old definition noted as idx_{old t0}, where the new definition on that date, noted as idx_{new t0}, should be such that idx_{old t0}=idx_{new t0}.

These definitions are used to derive the new baseline as follows:

$$idx_{new\,t0} = idx_{old\,t0} \iff \frac{\text{new measure}}{\text{new baseline}} =$$

-continued $$idx_{old\,t0} \Leftrightarrow new\ baseline = \frac{new\ measure}{idx_{old\,t0}}, (idx_{old\,t0} > 0)$$

According to some example embodiments, when updating the index based on the new derivation, the index becomes a conditional system represented as follows:

$$idx = \left\{ \frac{old\ measure}{old\ baseline}, t < t0 \frac{new\ measure}{new\ baseline}, t \geq t0 \right.$$

The index is then computed leveraging stable warehouses using the output of the stable warehouses as input for the compilation time global index. In some example embodiments, the compilation time global index is formulated as:

$$\frac{Total\ Compile\ Time}{Number\ of\ XP\ Jobs \times Baseline}$$

Where the baseline is a constant value based on a specific date and XP is the execution platform. As the stable warehouses are leveraged (e.g., relied upon) to compute compilation time global index, the compile time divided by jobs is computed with a non-zero XP time and divided by XP jobs.

Returning to FIG. 4, the performance index manager 480 further includes the sub-indexes service 486, which provides for drill-down dimensionality within the performance index. Drill-down dimensions are used in data visualization and analysis to allow users or customers to explore a dataset at various levels of granularity. This can be useful for identifying patterns or trends in the data that may not be immediately apparent at a higher level of aggregation. Drill-down dimensions can be implemented in various data visualization tools, such as user interfaces, dashboard software and business intelligence platforms (described in more detail in connection with FIG. 7).

The sub-indexes service 486 manages subset indexes or sub-indexes that provide drill-down dimensions (e.g., workload types, customer accounts, query types, deployments, etc.) for any metric or performance change. The sub-indexes service 486 enables a customer or user to employ drill-down dimension features for data visualization. The drill-down dimension can enable the customer or user to interact with multi-dimensional data set(s) by navigating through the hierarchical structure of the data. Drill-down dimensionality enables the customer or user to gain additional insights from the data by uncovering hidden patterns, relationships, and the like, as well as providing the customer or user with additional data factors to make more informed decisions based on the data than would otherwise be shown in a global performance index. Along each dimension of the drill-down dimensions, the performance index manager 480 further computes contributions from distinct values to the overall global index. The drill-down dimension analysis incorporates the impact of a particular value (e.g., account) on observed performance changes.

Providing different dimensions allows customers or users to explore data in greater detail and view performance data on specific components of the cloud data platform (e.g., as opposed to the performance of the platform as a whole). For example, sub-indexes can be created to manage the performance monitoring for a subset of components of the cloud data platform. The sub-indexes can be, for example, groups of deployments, customer accounts, system components (e.g., compute service manager 108, execution platform 110, etc.), workload classifications (e.g., data warehouse, data engineering, data science, data application, etc.), statement types (e.g., Data Definition Language (DDL), Structure Query Language (SQL), Data Manipulation Language (DML), etc.), warehouses (e.g., which warehouses are running), recurrent queries (e.g., which queries are running), resource types within a compute cluster (e.g., CPU, I/O, network, idleness, etc.) and operator types (e.g., the type of execution operator in the execution plan), parameter value, release version, and the like.

The performance index manager 480 further includes the index definition service 487. The index definition service 487 manages evolving definitions of the index over time. As new features and new metrics are added to the cloud data platform, the performance index definition (e.g., computation logic) evolves to adapt these changes. However, this makes it hard to compare the index before and after the definition change. The performance index service 109 resolves this problem by implementing a definition upgrade capability, where the N and N+1 versions of the definitions are both computed for overlapping time periods, such that the index computed from the new definition could start from a comparable baseline that is also computed with the previous definition. This ensures that the index is still comparable after evolving the definition. For example, after an updated or evolved definition is determined, the performance index service 109 computes the index as a relative number, as a ratio between two adjacent windows, so that updated index definition can be incrementally improved without backfilling, which maximizes overlap and coverage of index values.

The performance index manager 480 further includes the compositions and contributions service 488. As the index, sub-indexes, or compilation of indexes are composable, by employing the concept of contribution, the contribution can be determined to be a contributor from any factor. For example, if there are five factors in a given dimension (e.g., parameters, components of the system, etc.), the factors can be used to determine what contribution is causing the impact the customer or user is receiving in the performance index. More specifically, the compositions and contributions service 488 can include what metrics are used to build the performance index and what drill-down dimensions are available. In additional example embodiments, new metrics, parameters, drill-down dimensions, etc. can be incorporated into the index through standardized processes (e.g., usage and accuracy tracking), and the new metrics will become composable within the performance index framework in an automatic manner.

In some example embodiments, the compositions and contributions service 488 manages two types of contributions, one for computing the contribution of a category within a same time window, and another for measuring the contribution to changes between two adjacent time windows. For example, the compositions and contributions service 488 can manage contributions in two contexts: (1) to understand a static value of the index (e.g., what drives the index today), or (2) to understand a change in the index (e.g., why did the index increase from August to September).

For contribution within the same time window, this metric is meant to measure how different the index would be if a sub-category (e.g., parameter, a deployment, a statement type, etc.) was excluded. For example, if a deployment or a statement type was excluded from the index. If the contribution is positive, then the index would have a lower value (e.g., grown less) without the sub-category; conversely, if the contribution is negative, then the index would have a higher value without the sub-category. In other words, a positive contribution indicates that a sub-category is slower than its peers.

When analyzing an index value, a customer or user will want to understand what is pushing the index value. The compositions and contributions service 488 can compute what the index would be without a particular sub-category, the difference illustrating how much that category contributes to the whole. The contribution formula for a single time period is as follows:

$$\text{contribution} = \frac{m}{u \times \text{baseline}} - \frac{m - m_{sub-category}}{(u - u_{sub-category}) \times \text{baseline}}$$

Where m is defined as the metric measured in the index (e.g., execution platform time), u as the number of units in the index (e.g., number of jobs), m_sub-category, u_sub-category as those values for a specific sub-category (e.g., u_sub-category could be the number of jobs in prod1), and baseline is the indexing denominator, which is a constant where baseline is denoted in unit [m/u].

As the performance index value will change over periods of time (e.g., daily, weekly, yearly, etc.), the compositions and contributions service 488 provides for analysis and understanding of contribution to the index. By employing different contribution formulas (expressed below), the compositions and contributions service 488 can determine how much of the increase or decrease in the index value was caused by a specific dimension (e.g., deployment, account, warehouse, statement type, industry, workload, etc.). The value of the contribution can be expressed as exactly how much of an impact a specific sub-category has on the performance index. For example, if a deployment contributes 0.5 to the index value, and the index value is 1.2, then it can be concluded that without this deployment, the index value would be 1.2-0.5=0.7.

The contribution formula for comparing two time periods according to example embodiments is as follows:

$$\text{contribution} = idx_{t2} - idx_{t1} - \left(\frac{m_{t2} - m_{t2 sub}}{(u_{t2} - u_{t2 sub}) \times c} - \frac{m_{t1} - m_{t1 sub}}{(u_{t1} - u_{t1 sub}) \times c}\right) =$$

$$\frac{m_{t2} \times u_{t1} - m_{t1} \times u_{t2}}{u_{t1} \times u_{t2} \times c} - \frac{m_{t2} - m_{t2 sub}}{(u_{t2} - u_{t2 sub}) \times c} - \frac{m_{t1} - m_{t1 sub}}{(u_{t1} - u_{t1 sub}) \times c}$$

Where m is defined as a metric measured in the index (e.g., execution platform time), u is defined as a number of units in the index (e.g., number of jobs), $m_{t1}$, $m_{t2}$, $u_{t1}$, and $u_{t2}$ are values in a specific time period, $m_{t1\ sub}$, $m_{t2\ sub}$, $u_{t1\ sub}$, and $u_{t2\ sub}$ are those values for a specific sub-category (e.g., a number of jobs in a production being indexed), and where c is the indexing denominator, which acts as a constant where c is in unit [m/u]. When comparing the index values at t1 and t2, it is determined how much the index would have moved (e.g., changed) if a particular sub-category had not been present.

The contribution formula can be simplified according to some example embodiments to:

$$\text{contribution} = \frac{m_{t2} \times u_{t1} - m_{t1} \times u_{t2}}{u_{t1} \times u_{t2} \times c} - \frac{m_{t2} - m_{t2 sub}}{(u_{t2}) \times c} + \frac{m_{t1} - m_{t1 sub}}{(u_{t1}) \times c} =$$

-continued $$\frac{m_{t2 sub} \times u_{t1} - m_{t1\ sub} \times u_{t2}}{u_{t1} \times u_{t2} \times c}$$

Additional example embodiments can provide for other methods of computing the contribution of a category or sub-category, such as measuring contribution between non-adjacent time windows.

Contributors to detected performance changes, where the scenario includes specified detected performance changes, provide insight of the cause of the change. For example, using the performance index service 109, a performance change (e.g., improvements and/or regressions) is automatically detected or manually determined using a user interface (described in more detail herein in reference to FIG. 7). The performance index service 109 provides a contribution chart to identify the top to bottom contributors (e.g., contribution factor) of the change and enables selection of drill-down dimension(s) in the index service that corresponds to the contribution factor. The performance index service 109 can iteratively repeat the investigation until the root cause (e.g., contributor(s)) of the change is found.

In additional example embodiments, the performance index service 109 leverages performance index data to perform customized analyses. Including implementing and collecting feature specific data and joining the feature-specific data with performance index service-provided views to derive insights.

The performance index service 109 is illustrated as a distinct component of the cloud data platform 102; however, additional example embodiments of the performance index service 109 can be implemented by any of the virtual warehouses of the execution platform 110, such as the execution node 302-1, compute service manager 108, and/or the request processing service 208, in accordance with some embodiments of the present disclosure.

FIG. 5 shows a table 500 of the stable warehouse analyzer 450 illustrating measures used to identify a stable warehouse, according to some example embodiments. Customers of the cloud data platform 102 use warehouses, such as the virtual warehouses described and depicted in connection with FIG. 3, to encapsulate workloads, making warehouses a candidate for identifying units of stable workloads.

According to the example embodiment of FIG. 5, a warehouse is determined to be a stable warehouse during a specified period (e.g., during a running window of time) when a statistical performance analysis (e.g., variance to mean ratio (VMR)) determines that the warehouse's performance is consistent and predictable. For example, a VMR analysis can measure how much the individual observations deviate from the mean. Based on the analysis, a low VMR can indicate that the warehouse's performance is consistent and predictable, while a high VMR can indicate that the warehouse's performance is unpredictable and varies. For example, a stable warehouse may be identified based on a number of metric measurements 507 with consistent and/or predictable thresholds 532 over a running seven-day window.

In the example embodiment of FIG. 5, the metric measurements 507 are an illustrative set of specified metrics used to define a "stable" warehouse; however, different metrics can be used to define "stable" according to varying example embodiments. Here, the stable warehouse analyzer 450 defines stable warehouses as those that include, during a seven-day window, a credit VMR 507a being low enough, a number of jobs VMR 507b being low enough, a warehouse size 507c that does not change, a scaling policy 507d that does not change, an amount of data read VMR 507e being low enough, an amount of data written VMR 507f being low enough, and a peak, median, and average concurrency for the warehouse 507g being within a few percentage points each day. For example, a cloud data platform can have more than 100,000 active warehouses, for each of the 100,000 active warehouses, metric measurements and thresholds are modeled on a periodic or aperiodic basis in order to identify the number of stable warehouses. For example, out of those 100,000 active warehouses, 3,200 of the warehouses can be defined as being "stable" according to specified metrics measurements 507. While VMR analysis is exemplified in the example embodiment of FIG. 5, alternative or additional performance analysis measurements may be used to determine and/or define a "stable" warehouse or other "stable" data sources.

FIG. 6 shows a block diagram 600 depicting recurrent query identification processes as a source of comparison for generating a performance index, according to some example embodiments. In the example of FIG. 6, recurrent queries 661 are shown as a source of comparison for the cloud data platform performance index, where the recurrent queries 661 are those most likely to directly capture a customer's objective of running exactly the same query. Once a recurrent query is identified as a stable recurrent query 665, the stable recurrent query can be used as a supplement to stable warehouses for analysis in determining a stable workload.

To determine if a production query is a valid recurrent query, identification processes are implemented to determine when a query occurs again, which method can be used for identifying it as the same query. Once a method is selected, the query pattern is evaluated to confirm a temporary query is not identified as recurrent. For example, in addition to using SQL text hash to uniquely distinguish two queries from their SQL texts, additional criteria can be applied to observe queries in various dimensions. For example, binds can be ignored by replacing the binds with an identifier, while object reference can use a qualified name as a substitute. Additional criteria can be applied to introduce more sanitization and less strictness in SQL texts. For example, even if the SQL texts are different, two queries can share the same feature vector, making the two queries also appear almost identical.

In some example embodiments, recurrent queries 661 are defined leveraging a recurrent query infrastructure for collecting queries with the same sanitized SQL text hash. The recurrent query infrastructure detects queries that run at least n times per day, for n days in a row, with the same sanitized SQL text hash. For example, the recurrent query infrastructure may detect queries that run at least five times per day, for seven days in a row. In additional example embodiments, the recurrent query infrastructure provides for query failure states at a certain number or percentage (e.g., query can fail to run for five times, in only two continuous days), where the fault tolerance(s) of the query failure states can be updated automatically or manually.

Recurrent query jobs 663 further process the recurrent queries to filter out recurrent queries that include unstable job counts. For example, a statistical performance analysis, such as VMR, can be used to determine the VMR of job counts over a 14-day time period using 100 as the threshold to define stable recurrent queries. Additional statistical analyses can be used in place of VMR, such as coefficient variation, relative standard deviation, or the like, alone or in combination, to define stable recurrent queries. Additional example embodiments for determining stable recurrent queries 665 can include an exact query text hash, a parameterized query hash that normalizes bind values and object names, or additional hash techniques to identify recurrent queries.

In order to further define stable recurrent queries 665, the stability in query patterns is monitored and analyzed in order to guarantee that ad-hoc queries are not selected for analysis. To measure the stability in query patterns, additional properties are analyzed, such as the deployments where the recurrent query was or will be executed, the identification method applied for detecting unique queries, an interval length for evaluating recurrent queries, a number of intervals in one row for evaluating recurrent query status, and like. The stability in query patterns is further compared to additional detailed tables, such as recurrent query jobs 663 and recurrent query history 664, which provide aggregated statistics from all unique jobs, data about identified recurrent queries (e.g., status per interval, configuration property values, etc.), and data about all active recurrent queries.

Additional example embodiments include applying known recurrent queries data processing tasks to the identified recurrent queries according to a specific configuration, which filters out related job data from job staging 662 and inserts the identified queries in recurrent query job 663 tables and recurrent query history 664 tables at a higher frequency (e.g., hourly). The status of each of the identified recurrent queries is monitored to update the query pattern of each entry using previous data from earlier periods of time (e.g., daily) and/or using previous settings (e.g., different prior parameters).

Figure 7:
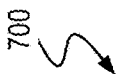
FIG. 7 shows an example user interface for displaying metrics and parameters of a performance index using data from the cloud data platform, according to some example embodiments.

FIG. 7 illustrates a representation of a user interface 700 that includes different dashboards 703 for managing performance of workloads, according to some example embodiments. Specifically, the user interface 700 depicts a dashboard displaying performance index parameter deployment (e.g., rollout) impact on stable warehouses.

The different dashboards 703 (e.g., user interfaces) are displayed to a customer or user for different usage scenarios, with filters on metrics, drill-down dimensions, performance parameters, and the like. In the example user interface 700, the dashboards 703 include a parameter dashboard 702, a metrics dashboard 704, a results dashboard 708, a chart dashboard 709, and a queries dashboard 760; however, additional dashboards may be automatically added or manually added by a customer or user.

For example, for every identified stable warehouse, the cloud data platform 102, or a component thereof such as the performance index service 109, identifies the first time a new parameter was enabled for workload. The performance index service 109 compares metrics for a period of time (e.g., 14 days) before and after the new parameter was enabled and assembles the metric intervals to provide the overall impact of the parameter to be displayed in the user interface.

In the example user interface 700, the displayed dashboard is the metrics dashboard 704, which provides data information on the impact of a parameter on a number of different performance metrics 706. The metrics dashboard 704 displays the metrics 706 that are more impacted by the current parameter. For example, the metrics include bytes written/produced per row 706a, compute credits per execution platform 706b, average execution time 706c, and average scheduling time 706d. For each metric 706, different impact data is provided, including average number before deployment of a parameter 721, average number after deployment of a parameter 722, the percentage change 723, and the significance 724. In additional example embodiments, a similar dashboard can be displayed to the customer or user providing performance index parameter deployment impact on recurrent queries.

Additional example embodiments can include a range of production and testing metrics to be measured, tracked, analyzed, and the like for inclusion in the performance index and/or for display via different user interfaces. For example, metrics can include resource utilization (e.g., the amount of CPU, memory, disk, and network resources being used), response time (e.g., the time it takes for a system to respond to a request), availability (e.g., the percentage of time that a system is available to handle requests), latency (e.g., the time it takes for a request to be processed and a response to be returned), error rate (e.g., the percentage of requests that result in errors or failures), throughput (e.g., the number of requests or transactions that a system can handle per unit of time, scaling (e.g., the ability of a system to handle an increase in load), and the like.

Further examples provide for different metrics to be indexed. For example, global metrics (e.g., total elapsed time, customer perceived components), component specific metrics, such as execution metrics (e.g., execution platform resource, execution platform operator), compute service manager metrics (e.g., compilation time), serverless feature metrics, and cost performance metrics (e.g., per job cost, price performance), including not just performance itself, but the price the customer is paying to deliver the same amount of work.

The different dashboards 703 can provide the customer or user with user interfaces to analyze performance trends over time and across dimensions, analyze the impact of a specific change, understand contributors to detected performance changes, detect performance issues, and demonstrate improvements to customers. For example, a dashboard for analyzing the impact of a specific change can provide a performance index to analyze the impact of the change during or after a release or deployment. The change can be identified as either a performance change (e.g., improvement or regression) based on the customer's workload, or a change in a cloud data platform 102 feature that may impact performance of the cloud data platform and/or the customer's workload. The impact on performance can be identified as a positive impact or a negative impact, and the measurements of performance change can be aggregated into a single performance index value or into one or more sub-indexes for a drilled-down dimension analysis.

In the illustrative example, FIG. 7 corresponds to an Internet browser user interface displayed on the client device 114 (e.g., a laptop) or other device of another user logged in the customer account. While Internet browser user interfaces are discussed in the illustrated examples, it is appreciated that the user interfaces can similarly be integrated into other applications, such as native applications of a client device operating system (e.g., a mobile application on a smartphone, a Linux application on a Linux laptop, windows application on a Windows enabled laptop, etc.).

FIG. 8 depicts a flow diagram of a method 800 for calculating a performance index, according to some example embodiments. The method 800 can be embodied in machine-readable instructions for execution by one or more hardware components (e.g., one or more processors) such that the operations of the method 800 can be performed by components of the cloud data platform 102. Accordingly, the method 800 is described below, by way of example with reference to components of the cloud data platform 102. However, it shall be appreciated that method 800 can be deployed on various other hardware configurations and is not intended to be limited to deployment within the cloud data platform 102.

Depending on the embodiment, an operation of the method 800 can be repeated in different ways or involve intervening operations not shown. Though the operations of the method 800 can be depicted and described in a certain order, the order in which the operations are performed may vary among embodiments, including performing certain operations in parallel or performing sets of operations in separate processes. While the various operations in this flowchart are presented and described sequentially, one of ordinary skill will appreciate that some or all of the operations may be executed in a different order, be combined or omitted, or be executed in parallel.

Operation 802 is for receiving, by the cloud data platform 102, metric source data from cloud data platform layer(s). The metric source data can include metrics, characteristics, parameters, workloads, and the like received from data sources, including stable data sources and unstable data sources. For example, metric source information can be received from the compute service manager 108, the execution platform 110, the client device 114, and/or additional external sources of metric-sharing sources (e.g., operatively connected customer platforms distinct from the cloud data platform 102).

From operation 802, the method 800 flows to operation 804 for identifying, by the cloud data platform 102, stable workload(s). From operation 804, the method 800 flows to operation 806 for generating, by the cloud data platform 102, a performance index. From operation 806, the method 800 flows to operation 808 for causing, by the cloud data platform 102, the generated performance index to be displayed on a user interface.

In some example embodiments, the performance index, while being constructed based on metric measurements, does not correspond to any physical performance metric and does not have a specific unit. The performance index can be used for comparison against historical performance indexes to provide meaning (e.g., compares a current performance index value to a previous performance index value).

Figure 9:
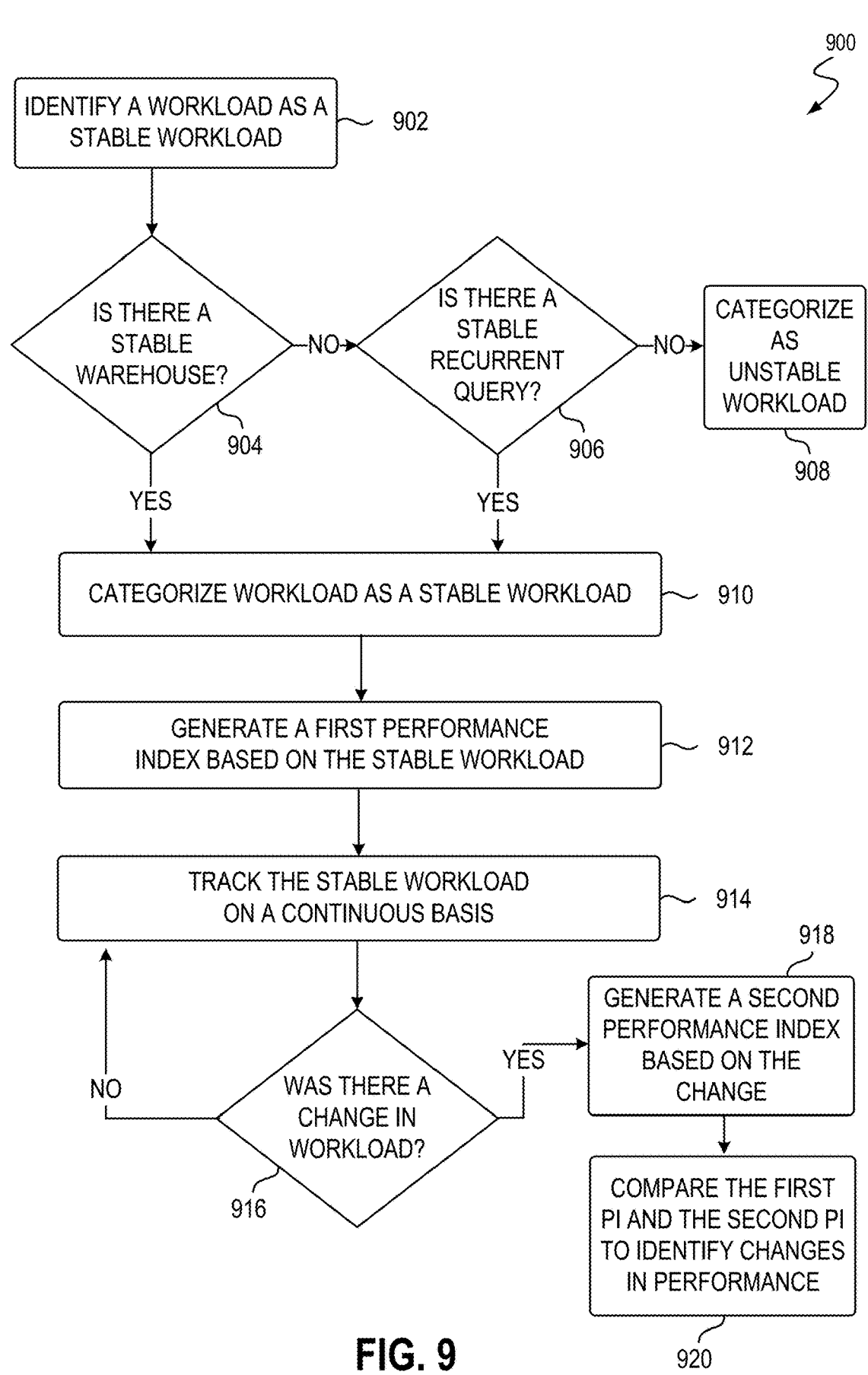
FIG. 9 is a flow diagram illustrating operations of a method for determining stable workloads, according to some example embodiments.

FIG. 9 shows a flow diagram of a method 900 for identifying a workload as a stable workload, according to some example embodiments. The method 900 can be embodied in machine-readable instructions for execution by one or more hardware components (e.g., one or more processors) such that the operations of the method 900 can be performed by components of the cloud data platform 102. Accordingly, the method 900 is described below, by way of example with reference to components of the performance index service 109. However, it shall be appreciated that method 900 can be deployed on various other hardware configurations and is not intended to be limited to deployment within the performance index service 109. In some example embodiments, the method 900 can be an operation, in whole or in part, of the method 800. For example, the method 900 can be an operation incorporated in the method 800 at or near operation 804, where identifying a stable workload can include the method 900.

Depending on the embodiment, an operation of the method 900 can be repeated in different ways or involve intervening operations not shown. Though the operations of the method 900 can be depicted and described in a certain order, the order in which the operations are performed may vary among embodiments, including performing certain operations in parallel or performing sets of operations in separate processes.

Operation 902 is for identifying, at the performance index service 109, a workload as a stable workload. In a cloud data platform, the workload can include user and/or customer tasks, processes, queries, applications, and/or other logical units of work that are executed in the cloud data platform 102.

From operation 902, the method 900 flows to operation 904 for determining, at the performance index service 109, if there is a stable warehouse. If the performance index service 109 determines yes, there is a stable warehouse, the method 900 flows to operation 910 for categorizing, at the performance index service 109, the workload as a stable workload.

Conversely, at operation 904, if the performance index service 109 determines that no, there is not a stable warehouse, the method 900 flows to operation 906, for determining, at the performance index service 109, if there is a stable recurrent query. If the performance index service 109 determines yes, there is a stable recurrent query, the method 900 flows to operation 910 for categorizing, at the performance index service 109, the workload as a stable workload. In some example embodiments, the performance index service 109 can determine that a stable warehouse exists and continue to determine if a stable recurrent query exists as well prior to categorizing the workload as a stable workload. Additional embodiments can include the performance index service 109 determining one or more individual stable data sources (e.g., stable data table, stable pipeline, etc.) and/or collections of stable data sources automatically or manually selected by a customer or user as being relevant for identifying stable workloads.

Conversely, at operation 906, if the performance index service 109 determines that no, there is not a stable recurrent query, the method 900 flows to operation 908, for categorizing the workload as an unstable workload.

From operation 910, the method 900 flows to operation 912 for generating, at the performance index service 109, a first performance index based on the stable workload.

From operation 912, the method 900 flows to operation 914 for tracking, at the performance index service 109, the stable workload on a continuous basis. In some example embodiments, tracking of the stable workload can occur on a periodic or aperiodic timeline.

From operation 914, the method 900 flows to operation 916 for determining, at the performance index service 109, if there was a change in workload. Changes in workload can include changes from the cloud data platform and/or changes by the customer workload in production. Workload changes can further include changes in versions, parameters, metrics, etc. that can be a singular change, group of changes, or completely new workloads.

If the performance index service 109 determines that no, there has not been a change in workload, the method 900 returns to operation 914 for continuous tracking.

Conversely, at operation 916, if the performance index service 109 determines that yes, there was a change in workload, the method 900 flows to operation 918 for generating, at the performance index service 109, a second performance index based on the change in workload.

From operation 918, the method 900 flows to operation 920 for comparing, at the performance index service 109, the first performance index to the second performance index to identify changes in performance.

Figure 10:
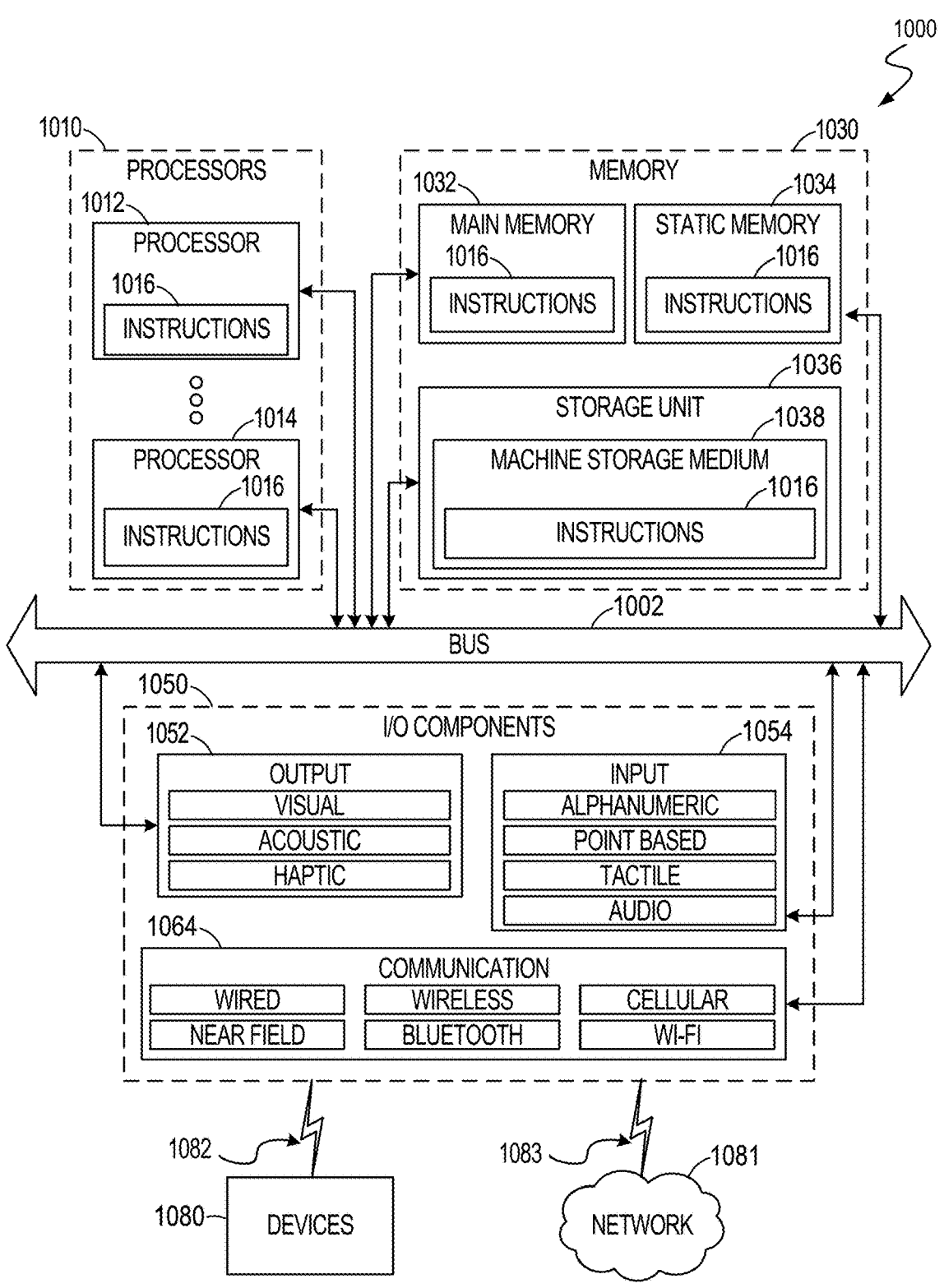
FIG. 10 illustrates a diagrammatic representation of a machine in the form of a computer system within which a set of instructions can be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions can be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. For example, the instructions 1016 may cause the machine 1000 to execute any one or more operations of any one or more of the methods described herein. As another example, the instructions 1016 may cause the machine 1000 to implement portions of the data flows described herein. In this way, the instructions 1016 transform a general, non-programmed machine into a particular machine 1000 (e.g., the compute service manager 108, the execution platform 110, the performance index service 109, client device 114) that is specially configured to carry out any one of the described and illustrated functions in the manner described herein.

In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 comprising a machine storage medium 1038 may store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1050 may include communication components 1064 operable to couple the machine 1000 to a network 1081 via a coupling 1083 or to devices 1080 via a coupling 1082. For example, the communication components 1064 may include a network interface component or another suitable device to interface with the network 1081. In further examples, the communication components 1064 may include wired communication components, wireless communication components, cellular communication components, and other communication components to provide communication via other modalities. The devices 1080 can be another machine or any of a wide variety of peripheral devices (e.g., a peripheral device coupled via a universal serial bus (USB)). For example, as noted above, the machine 1000 may correspond to any one of the client devices 114, the compute service manager 108, the execution platform 110, and the devices 1080 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1081 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1081 or a portion of the network 1081 may include a wireless or cellular network, and the coupling 1083 can be a Code Division Multiple Access (CDMA) connection, a Global System for Mobile communications (GSM) connection, or another type of cellular or wireless coupling. In this example, the coupling 1083 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 can be transmitted or received over the network 1081 using a transmission medium via a network interface device (e.g., a network interface component included in the communication components 1064) and utilizing any one of a number of well-known transfer protocols (e.g., hypertext transfer protocol (HTTP)). Similarly, the instructions 1016 can be transmitted or received using a transmission medium via the coupling 1082 (e.g., a peer-to-peer coupling) to the devices 1080. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Described implementations of the subject matter can include one or more features, alone or in combination as illustrated below by way of example. Each of these non-limiting examples can stand on its own or can be combined in various permutations or combinations with one or more of the other examples. The following examples detail certain aspects of the present subject matter to solve the challenges and provide the benefits discussed herein.

Example 1 can include a method comprising: receiving, by at least one hardware processor, a plurality of metric source data; identifying a workload, based at least in part on the plurality of metric source data, as a stable workload candidate; generating a performance index based on the workload being identified as the stable workload candidate; and tracking the performance index over a period of time.

In Example 2, the subject matter of Example 1 optionally includes wherein identifying the stable workload candidate further comprises: identifying a stable warehouse; identifying a stable recurrent query; identifying stable data sources; and categorizing the workload as a stable workload, based at least in part on the identified stable warehouse, the identified stable recurrent query, or the identified stable data sources.

In Example 3, the subject matter of Example 2 optionally includes wherein the stable workload is automatically detected based on production query patterns.

In Example 4, the subject matter of any one of Examples 1-3 optionally include wherein tracking the performance index comprises: identifying a first performance index based on the workload; detecting a modification to the workload; generating a second performance index based on the modification to the workload; comparing a value of the first performance index to a value of the second performance index; and generating a next performance index based on a result of the comparing of the value of the first performance index and the value of the second performance index.

In Example 5, the subject matter of Example 4 optionally includes wherein the value of the first performance index and the value of the second performance index is based on one of: a previous period of time, a previous parameter setting, a previous metric, or a previous definition.

In Example 6, the subject matter of any one of Examples-5 optionally include wherein tracking the performance index over the period of time further comprises: detecting, in an automatic manner, a definition change in the workload; regenerating the performance index based on the definition change in the workload; assessing an impact of the definition change in the workload; and identifying the impact to the workload as a performance regression or a performance improvement.

In Example 7, the subject matter of any one of Examples 1-6 optionally include tracking the performance index over the period of time further comprises: identifying adjacent comparison windows of the performance index, wherein the adjacent comparison windows include a first comparison window and a second comparison window; generating a first performance index based on the workload during the first comparison window; generating a second performance index based on the workload during the second comparison window; and identifying overlapping workloads between the first performance index and the second performance index to measure relative performance of the workload over the period of time.

In Example 8, the subject matter of any one of Examples 1-7 optionally include wherein the performance index is at least one of a global performance index or a performance sub-index, and wherein: the performance sub-index is generated based on a subcategory of the workload; and the global performance index comprises one or more performance sub-indexes.

In Example 9, the subject matter of any one of Examples 1-8 optionally include wherein identifying the workload as the stable workload candidate further comprises: identifying the workload based on production workloads; and defining the stable workload candidate to isolate impacts associated with changes to the production workloads from impacts associated with changes to a data platform.

In Example 10, the subject matter of any one of Examples 1-9 optionally include further comprising causing the performance index to be displayed in a user interface.

Example 11 is a system comprising: one or more hardware processors of a machine; and at least one memory storing instructions that, when executed by the one or more hardware processors, cause the system to perform operations comprising: receiving, by at least one hardware processor, a plurality of metric source data; identifying a workload, based at least in part on the plurality of metric source data, as a stable workload candidate; generating a performance index based on the workload being identified as the stable workload candidate; and tracking the performance index over a period of time.

In Example 12, the subject matter of Example 11 optionally includes the operations further comprising: identifying a stable warehouse; identifying a stable recurrent query; identifying stable data sources; and categorizing the workload as a stable workload, based at least in part on the identified stable warehouse, the identified stable recurrent query, or the identified stable data sources.

In Example 13, the subject matter of Example 12 optionally includes wherein the stable workload is automatically detected based on production query patterns.

In Example 14, the subject matter of any one of Examples 11-13 optionally include the operations comprising: identifying a first performance index based on the workload; detecting a modification to the workload; generating a second performance index based on the modification to the workload; comparing a value of the first performance index to a value of the second performance index; and generating a next performance index based on the comparing of the value of the first performance index and the value of the second performance index.

In Example 15, the subject matter of Example 14 optionally includes wherein the value of the first performance index and the value of the second performance index is based on one of a previous period of time, a previous parameter setting, a previous metric, or a previous definition.

In Example 16, the subject matter of any one of Examples 11-15 optionally includes the operations further comprising: detecting, in an automatic manner, a definition change in the workload; regenerating the performance index based on the definition change in the workload; assessing an impact of the definition change in the workload; and identifying the impact to the workload as a performance regression or a performance improvement.

In Example 17, the subject matter of any one of Examples 11-16 optionally includes the operations further comprising: identifying adjacent comparison windows of the performance index, wherein the adjacent comparison windows include a first comparison window and a second comparison window; generating a first performance index based on the workload during the first comparison window; generating a second performance index based on the workload during the second comparison window; and identifying overlapping workloads between the first performance index and the second performance index to measure relative performance of the workload over the period of time.

In Example 18, the subject matter of any one of Examples 11-17 optionally include wherein the performance index is at least one of a global performance index or a performance sub-index, and wherein: the performance sub-index is generated based on a subcategory of the workload; and the global performance index comprises one or more performance sub-indexes.

In Example 19, the subject matter of any one of Examples 11-18 optionally include the operations further comprising: identifying the workload based on production workloads; and defining the stable workload candidate to isolate impacts associated with changes to the production workloads from impacts associated with changes to a data platform.

In Example 20, the subject matter of any one of Examples 11-19 optionally include further comprising causing the performance index to be displayed in a user interface.

Example 21 is a machine-readable storage device embodying instructions that, when executed by a machine, cause the machine to perform operations comprising: receiving, by at least one hardware processor, a plurality of metric source data; identifying a workload, based at least in part on the plurality of metric source data, as a stable workload candidate; generating a performance index based on the workload being identified as the stable workload candidate; and tracking the performance index over a period of time.

In Example 22, the subject matter of Example 21 optionally includes wherein identifying the stable workload candidate further comprises: identifying a stable warehouse; identifying a stable recurrent query; identifying stable data sources; and categorizing the workload as a stable workload, based at least in part on the identified stable warehouse, the identified stable recurrent query, or the identified stable data sources.

In Example 23, the subject matter of Example 22 optionally includes wherein the stable workload is automatically detected based on production query patterns.

In Example 24, the subject matter of any one of Examples 21-23 optionally include wherein tracking the performance index further comprises: identifying a first performance index based on the workload; detecting a modification to the workload; generating a second performance index based on the modification to the workload; comparing a value of the first performance index to a value of the second performance index; and generating a next performance index based on the comparing of the value of the first performance index and the value of the second performance index.

In Example 25, the subject matter of Example 24 optionally includes wherein the value of the first performance index and the value of the second performance index is based on one of a previous period of time, a previous parameter setting, a previous metric, or a previous definition.

In Example 26, the subject matter of any one of Examples 21-25 optionally include wherein tracking the performance index over the period of time further comprises: detecting, in an automatic manner, a definition change in the workload; regenerating the performance index based on the definition change in the workload; assessing an impact of the definition change in the workload; and identifying the impact to the workload as a performance regression or a performance improvement.

In Example 27, the subject matter of any one of Examples 21-26 optionally include wherein tracking the performance index over the period of time further comprises: identifying adjacent comparison windows of the performance index, wherein the adjacent comparison windows include a first comparison window and a second comparison window; generating a first performance index based on the workload during the first comparison window; generating a second performance index based on the workload during the second comparison window; and identifying overlapping workloads between the first performance index and the second performance index to measure relative performance of the workload over the period of time.

In Example 28, the subject matter of any one of Examples 21-27 optionally include wherein the performance index is at least one of a global performance index or a performance sub-index, and wherein: the performance sub-index is generated based on a subcategory of the workload; and the global performance index comprises one or more performance sub-indexes.

In Example 29, the subject matter of any one of Examples 21-28 optionally include wherein identifying the workload as the stable workload candidate further comprises: identifying the workload based on production workloads; and defining the stable workload candidate to isolate impacts associated with changes to the production workloads from impacts associated with changes to a data platform.

In Example 30, the subject matter of any one of Examples 21-29 optionally include further comprising causing the performance index to be displayed in a user interface.

The terms "machine-readable medium," "computer-readable medium," and "device-readable medium" mean the same thing and can be used interchangeably in this disclosure. The terms are defined to include both machine-storage media and transmission media. Thus, the terms include both storage devices/media and carrier waves/modulated data signals.

The various operations of example methods described herein can be performed, at least partially, by one or more processors that are temporarily configured (e.g., by software) or permanently configured to perform the relevant operations. Similarly, the methods described herein can be at least partially processor implemented. For example, at least some of the operations of the methods described herein can be performed by one or more processors. The performance of certain of the operations can be distributed among the one or more processors, not only residing within a single machine, but also deployed across a number of machines. In some example embodiments, the processor or processors can be located in a single location (e.g., within a home environment, an office environment, or a server farm), while in other embodiments the processors can be distributed across a number of locations.

Although the embodiments of the present disclosure have been described with reference to specific example embodiments, it will be evident that various modifications and changes can be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter can be practiced. The embodiments illustrated are described in sufficient detail to enable those skilled in the art to practice the teachings disclosed herein. Other embodiments can be used and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
receiving, by at least one hardware processor, a plurality of metric source data;
identifying a workload, based at least in part on the plurality of metric source data, as a stable workload candidate, the stable workload candidate comprising a workload that satisfies at least one predefined stability threshold for one or more production metrics over a running time window;
generating a performance index based on the workload being identified as the stable workload candidate, the performance index comprising at least one of: a global performance index or a performance sub-index associated with the workload; and
tracking the performance index over a period of time.

2. The method of claim 1, wherein:
the performance sub-index is generated based on a sub-category of the workload; and
the global performance index comprises one or more performance sub-indexes.

3. The method of claim 1, wherein identifying the workload as the stable workload candidate further comprises:
identifying the workload based on production workloads; and
defining the stable workload candidate to isolate impacts associated with changes to the production workloads from impacts associated with changes to a data platform.

4. The method of claim 1, wherein tracking the performance index over the period of time further comprises:
detecting, in an automatic manner, a definition change in the workload;
regenerating the performance index based on the definition change in the workload;
assessing an impact of the definition change in the workload; and
identifying the impact to the workload as a performance regression or a performance improvement.

5. The method of claim 1, wherein tracking the performance index over the period of time further comprises:
identifying adjacent comparison windows of the performance index, wherein the adjacent comparison windows include a first comparison window and a second comparison window;
generating a first performance index based on the workload during the first comparison window;
generating a second performance index based on the workload during the second comparison window; and
identifying overlapping workloads between the first performance index and the second performance index to measure relative performance of the workload over the period of time.

6. The method of claim 5, wherein tracking the performance index comprises:
comparing a value of the first performance index to a value of the second performance index, wherein the value of the first performance index and the value of the second performance index are based on one of: a previous period of time, a previous parameter setting, a previous metric, or a previous definition.

7. The method of claim 6, further comprising:
generating a next performance index based on a result of the comparing of the value of the first performance index and the value of the second performance index.

8. The method of claim 1, wherein identifying the stable workload candidate further comprises:
identifying a stable warehouse;
identifying a stable recurrent query;
identifying stable data sources; and
categorizing the workload as a stable workload, based on at least one of the identified stable warehouse, the identified stable recurrent query, or the identified stable data sources.

9. The method of claim 8, wherein the stable workload is automatically detected based on production query patterns.

10. The method of claim 1, further comprising:
causing the performance index to be displayed in a user interface.

11. A system comprising:
one or more hardware processors of a machine; and
at least one memory storing instructions that, when executed by the one or more hardware processors, cause the system to perform operations comprising:
receiving a plurality of metric source data;
identifying a workload, based at least in part on the plurality of metric source data, as a stable workload candidate, the stable workload candidate comprising a workload that satisfies at least one predefined stability threshold for one or more production metrics over a running time window;
generating a performance index based on the workload being identified as the stable workload candidate, the performance index comprising at least one of: a global performance index or a performance sub-index associated with the workload; and
tracking the performance index over a period of time.

12. The system of claim 11, wherein:

the performance sub-index is generated based on a sub-category of the workload; and the global performance index comprises one or more performance sub-indexes.

13. The system of claim 11, wherein identifying the workload as the stable workload candidate further comprises:

identifying the workload based on production workloads; and defining the stable workload candidate to isolate impacts associated with changes to the production workloads from impacts associated with changes to a data platform.

14. The system of claim 11, wherein tracking the performance index over the period of the time further comprises:

detecting, in an automatic manner, a definition change in the workload;

regenerating the performance index based on the definition change in the workload;

assessing an impact of the definition change in the workload; and identifying the impact to the workload as a performance regression or a performance improvement.

15. The system of claim 11, wherein tracking the performance index over the period of time further comprises:

identifying adjacent comparison windows of the performance index, wherein the adjacent comparison windows include a first comparison window and a second comparison window;

generating a first performance index based on the workload during the first comparison window;

generating a second performance index based on the workload during the second comparison window; and identifying overlapping workloads between the first performance index and the second performance index to measure relative performance of the workload over the period of time.

16. The system of claim 15, wherein tracking the performance index comprises:

comparing a value of the first performance index to a value of the second performance index, wherein the value of the first performance index and the value of the second performance index are based on one of: a previous period of time, a previous parameter setting, a previous metric, or a previous definition.

17. The system of claim 16, the operations further comprising:

generating a next performance index based on a result of the comparing of the value of the first performance index and the value of the second performance index.

18. The system of claim 11, wherein identifying the stable workload candidate further comprises:

identifying a stable warehouse;

identifying a stable recurrent query;

identifying stable data sources; and categorizing the workload as a stable workload, based on at least one of the identified stable warehouse, the identified stable recurrent query, or the identified stable data sources.

19. The system of claim 11, wherein the stable workload is automatically detected based on production query patterns.

20. The system of claim 11, the operations further comprising:

causing the performance index to be displayed in a user interface.

21. A computer-storage medium comprising instructions that, when executed by one or more processors of a machine, cause the machine to perform operations comprising:

receiving a plurality of metric source data;

identifying a workload, based at least in part on the plurality of metric source data, as a stable workload candidate, the stable workload candidate comprising a workload that satisfies at least one predefined stability threshold for one or more production metrics over a running time window;

generating a performance index based on the workload being identified as the stable workload candidate, the performance index comprising at least one of: a global performance index or a performance sub-index associated with the workload; and tracking the performance index over a period of time.

22. The computer-storage medium of claim 21, wherein:

the performance sub-index is generated based on a sub-category of the workload; and the global performance index comprises one or more performance sub-indexes.

23. The computer-storage medium of claim 21, wherein identifying the workload as the stable workload candidate further comprises:

identifying the workload based on production workloads; and defining the stable workload candidate to isolate impacts associated with changes to the production workloads from impacts associated with changes to a data platform.

24. The computer-storage medium of claim 21, wherein tracking the performance index over the period of the time further comprises:

detecting, in an automatic manner, a definition change in the workload;

regenerating the performance index based on the definition change in the workload;

assessing an impact of the definition change in the workload; and identifying the impact to the workload as a performance regression or a performance improvement.

25. The computer-storage medium of claim 21, wherein tracking the performance index over the period of time further comprises:

identifying adjacent comparison windows of the performance index, wherein the adjacent comparison windows include a first comparison window and a second comparison window;

generating a first performance index based on the workload during the first comparison window;

generating a second performance index based on the workload during the second comparison window; and identifying overlapping workloads between the first performance index and the second performance index to measure relative performance of the workload over the period of time.

26. The computer-storage medium of claim 25, wherein tracking the performance index comprises:

comparing a value of the first performance index to a value of the second performance index, wherein the value of the first performance index and the value of the second performance index are based on one of: a previous period of time, a previous parameter setting, a previous metric, or a previous definition.

27. The computer-storage medium of claim 26, the operations further comprising:

generating a next performance index based on a result of the comparing of the value of the first performance index and the value of the second performance index.

28. The computer-storage medium of claim 21, wherein identifying the stable workload candidate further comprises:

identifying a stable warehouse;

identifying a stable recurrent query;

identifying stable data sources; and categorizing the workload as a stable workload, based on at least one of the identified stable warehouse, the identified stable recurrent query, or the identified stable data sources.

29. The computer-storage medium of claim 28, wherein the stable workload is automatically detected based on production query patterns.

30. The computer-storage medium of claim 21, the operations further comprising:

causing the performance index to be displayed in a user interface.

* * * * *